(12) United States Patent
Yoon

(10) Patent No.: US 8,416,446 B2
(45) Date of Patent: Apr. 9, 2013

(54) IMAGE FORMING APPARATUS HAVING PRINTING LOG MANAGEMENT FUNCTION AND METHOD THEREOF

(75) Inventor: Sun-joo Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1475 days.

(21) Appl. No.: 11/102,755

(22) Filed: Apr. 11, 2005

(65) Prior Publication Data
US 2005/0259293 A1  Nov. 24, 2005

(30) Foreign Application Priority Data

Apr. 16, 2004  (KR) ......................... 10-2004-0026254

(51) Int. Cl.
*G06K 15/00*  (2006.01)
(52) U.S. Cl.
USPC ........................................ 358/1.16; 358/1.15
(58) Field of Classification Search ........... 358/1.1–1.16
See application file for complete search history.

(56) References Cited

U.S. PATENT DOCUMENTS

| 5,890,173 | A | * | 3/1999 | Yoda | 715/209 |
| 6,065,015 | A | * | 5/2000 | Kazami | 352/67 |
| 7,298,511 | B2 | * | 11/2007 | Lay et al. | 358/1.15 |
| 2002/0040303 | A1 | * | 4/2002 | Hamamura et al. | 705/1 |
| 2002/0048036 | A1 | * | 4/2002 | Nakagawa et al. | 358/1.14 |
| 2004/0041913 | A1 | * | 3/2004 | Takasumi et al. | 348/207.2 |
| 2004/0061876 | A1 | * | 4/2004 | Iida | 358/1.5 |
| 2005/0254088 | A1 | * | 11/2005 | Park et al. | 358/1.16 |

FOREIGN PATENT DOCUMENTS

| JP | 11-105381 | 4/1999 |
| JP | 11-129556 | 5/1999 |
| JP | 2000-295441 | 10/2000 |
| JP | 2002-204417 | 7/2002 |
| KR | 2001-18369 A | 3/2001 |

OTHER PUBLICATIONS

Korean Office Action dated Jun. 18, 2007 issued in KR 2004-26254.

* cited by examiner

*Primary Examiner* — Benny Q Tieu
*Assistant Examiner* — Michael Y Tzeng
(74) *Attorney, Agent, or Firm* — Stanzione & Kim, LLP

(57) ABSTRACT

An image forming apparatus and a method thereof has a printing log management function. An image forming apparatus allows a connection with an external memory device such as a mobile memory card, and prints out an image in accordance with the image data file which is stored in the external memory device. Among many files stored in the external memory device, the image forming apparatus memorizes and stores the information about the files which have been printed at least once, or specifically selected by a user. Accordingly, the user is enabled to print once-printed images or specific images without endeavoring cumbersome processes such as search or selection of a desired image data file. As a result, printing operations can be carried out faster and more efficiently.

21 Claims, 3 Drawing Sheets

| No. | Date | Time | File Data information | | Capacity | Job Type |
|---|---|---|---|---|---|---|
| 1. | 2004/02/14 | 15:16:12 | 2004/02/10 | 13:24:12  pic12.jpg | 841752 | print |
| 2. | 2004/02/14 | 16:28:41 | 2002/01/09 | 08:12:35  Image1.jpg | 72453 | Group1 |
| 3. | 2004/02/14 | 16:28:41 | 2002/01/09 | 10:21:28  Image9.jpg | 601317 | Group1 |
| 4. | 2004/02/14 | 19:45:07 | 2004/02/10 | 13:24:12  pic19.jpg | 784516 | print |
| 5. | 2004/02/14 | 20:03:21 | 2003/08/31 | 22:14:41  0127.jpg | 504817 | Group2 |
| : | : | : | : | : | : | : |

| No. | Date | Time | File Data information | | Capacity | Job Type |
|---|---|---|---|---|---|---|
| 1. | 2004/02/14 | 15:16:12 | 2004/02/10 | 13:24:12 | pic12.jpg | 841752 | print |
| 2. | 2004/02/14 | 16:28:41 | 2002/01/09 | 08:12:35 | Image1.jpg | 72453 | Group1 |
| 3. | 2004/02/14 | 16:28:41 | 2002/01/09 | 10:21:28 | Image9.jpg | 601317 | Group1 |
| 4. | 2004/02/14 | 19:45:07 | 2004/02/10 | 13:24:12 | pic19.jpg | 784516 | print |
| 5. | 2004/02/14 | 20:03:21 | 2003/08/31 | 22:14:41 | 0127.jpg | 504817 | Group2 |
| ⋮ | ⋮ | ⋮ | ⋮ | | ⋮ | ⋮ | ⋮ |

310 — 321 — 322 — 323 — 330

320

IMAGE FORMING APPARATUS HAVING PRINTING LOG MANAGEMENT FUNCTION AND METHOD THEREOF

CROSS-REFERENCE TO RELATED APPLICATIONS

This application claims the benefit of Korean Patent Application No. 2004-26254, filed on Apr. 16, 2004, in the Korean Intellectual Property Office, the entire disclosure of which is incorporated herein in its entirety by reference.

BACKGROUND OF THE INVENTION

1. Field of the Invention

The present general inventive concept relates to an image forming apparatus to which an external memory device can be connected. More particularly, the present general inventive concept relates to an image forming apparatus having a printing log management function and a method thereof, which stores in a printing log when a printing is performed so that rapid and easy printing is enabled when a once-printed file is printed thereafter.

2. Description of the Related Art

An image forming apparatus such as a printer, a multi-function office machine including a printer function, and a photograph printer is usually provided with a computer as a host device. Once the image data are written through a document writer of a computer or image data are inputted through a scanner, the image data are emulated into language suitable for the image forming apparatus, and then transmitted to the image forming apparatus. As a result, an image corresponding to the transmitted image data is printed by the image forming apparatus.

With the introduction of a new storage medium such as a mobile memory card using flash memory technology, an image forming apparatus is also required to read and print image data directly from the mobile memory card.

The mobile memory card can be connected to a digital camera to record image data, or used as a mobile storage medium for the image data stored in the computer. Once the image data are written on these new kinds of storage medium such as a mobile memory card, the data are not necessarily stored in the computer and then transmitted to the printer to be printed. In other words, the mobile memory card can be directly connected to the printer, multi-function office machine or photo printer for the printing of written image data. Therefore, an 'external memory device' hereinafter will refer to such a memory card, and a mobile memory card can be one example of the external memory device.

In a conventional way, a user has to select an image data file corresponding to the image of the external memory device through an indicating device which is attached to the connected printer. When the user selects an image data file, the printer prints the image corresponding to the selected image data file. For the user to select an image data file, the image forming apparatus, such as a printer, indicates information of the files which is read from the external memory device.

A problem arises from the limited capacity of the indicating device of the image forming apparatus. For example, the indicating device of a general image forming apparatus is not large enough to display file information as monitors of computers do. In contrast, the new type of storage medium, such as a mobile memory card, has now been developed to have a high capacity in accordance with the improved integration technology of flash memory, and therefore, it now can store up to several tens of data files at once. A general image forming apparatus displays one data file usually for 3 to 5 seconds. This means that the user has to wait approximately three to six minutes to view 50 files, and is also required to manipulate the indicating device approximately 50 times. A group of files may be displayed at once. For example, one to five files can be displayed at the same time. However, this also causes an inconvenience because the user has to perform many searches in order to find a desired file.

SUMMARY OF THE INVENTION

Accordingly, the present general inventive concept provides an image forming apparatus and a method thereof, which stores not only the file information of a once-printed image data file, but also separately stores file information of a user's chosen data file, and therefore reduces unnecessary consumption of time and labor for the search, selection and printing of a once-selected data file and subsequently improves printing operation efficiency.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept can substantially be achieved by providing an image forming apparatus which allows a connection of an external memory device storing therein print data and file information corresponding to the print data, the image forming apparatus including a connecting part to connect the external memory device, and a controller to compare the print data and the corresponding file information of the connected external memory device and confirm whether or not the printing has been previously performed.

A memory to store the file information may be further provided. Additionally, a display may be further provided to display at least one among the print data and the corresponding file information.

When the external memory device or another type of external memory device is re-connected to the image forming device, the controller may read from the memory file information which corresponds to re-received file information transmitted through the connecting part and display the file information read from the memory through the display.

The controller may store group file information in the memory, the group file information comprising file information selected among the file information received through the connecting part, and when the external memory device or another type of external memory device is re-connected to the image forming device, the controller may read from the memory the group file information which corresponds to re-received file information transmitted through the connecting part from the re-connected external memory device or other type of external memory device, and display the read group file information through the display.

A print part may be further provided to print at least one of the print data and the corresponding file information.

The controller may control the print part such that the print part prints out an image which corresponds to the print data corresponding to the selected information among the file information and the group file information displayed through the display.

A manipulation part may be further provided to enable a user to select at least one among the file information and the group file information which are displayed through the display.

The foregoing and/or other aspects and advantages of the present general inventive concept may also substantially be achieved by providing a printing log management method of an image forming apparatus which allows a connection with an external memory device, the external memory device storing therein print data and file information corresponding to the print data, the printing log management method including reading out the print data and the corresponding file information from the external memory device, and comparing the print data and the corresponding file information and confirming whether or not the printing has been previously performed.

When the external memory device or another type of external memory device is re-connected to the image forming device, the method may further provide reading from the re-connected external memory device previously read file information and displaying the file information which corresponds to the stored file information.

The method may further provide designating certain selected file information among the read file information as group file information and storing the group file information; and when the external memory device or other type of external memory device is re-connected to the image forming device, displaying file information which corresponds to the re-received file information among the file information of the stored group file information. Additionally, the method may further provide printing an image onto a printing paper, the image corresponding to print data which corresponds to selected information among the displayed file information and the group file information.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 illustrates exemplary log file information and group file information which are stored in a memory according to an embodiment of the present general inventive concept.

DETAILED DESCRIPTION OF THE PREFERRED EMBODIMENTS

Figure 1:
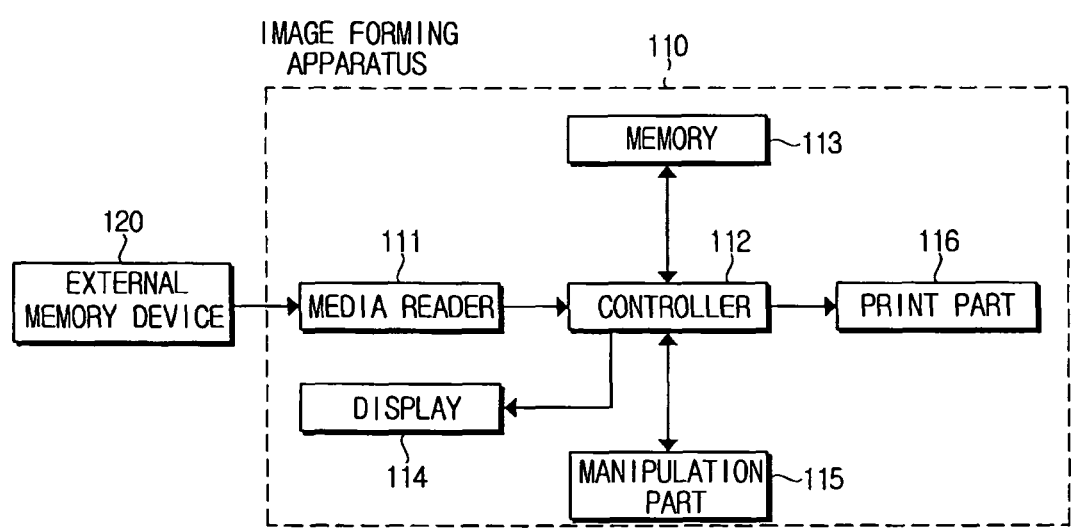
FIG. 1 is a block diagram of an image forming apparatus which has a printing log management function according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same drawing reference numerals are used for the same elements even in different drawings. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

FIG. 1 is a block diagram of an image forming apparatus which has a printing log management function according to an embodiment of the present general inventive concept. Referring to FIG. 1, an external memory device 120 is connected to an image forming apparatus 110 according to an embodiment of the present general inventive concept.

The external memory device 120 includes a terminal to provide connection to the image forming apparatus' 110, and stores therein image data to be printed. Any suitable types of memory devices can be applied as the external memory device 120 which can be read through a media reader 111 of the image forming apparatus 110. For example, the external memory device 120 may include a mobile memory card using a flash memory technology, a floppy disc, and a hard disc.

Although there is no limit to the format of the stored image data files, the storage formats usually available for the reading of computers such as 'tiff', 'jpg', 'gif', 'bmp', and 'png' may be preferred. Because the external memory device 120 can store more than one data file therein, the external memory device 120 also keeps a file system to separately record file information beside the image data files themselves. The contents of the file information may include the file position, file name, date of recording, and file size.

The image forming apparatus 110 according to an embodiment of the present general inventive concept includes the media reader 111, a controller 112, a memory 113, a display 114, a manipulation part 115 and a print part 116.

The image forming apparatus 110 in this embodiment refers to an image forming apparatus which allows connection of the external memory device 120 thereto. Accordingly, the image forming apparatus 110 in this embodiment allows connection of the external memory device 120, such as multi-function office machine and a photo printer, in addition to the printers for a computer.

The media reader 111 is a connection part which is connected to the external memory device 120, and is capable of retrieving image data files and file information thereof from the external memory device 120. The file information may include the time of data recording on the external memory device 120, file name and size. The media reader 111 may vary depending on the type of the external memory device 120 connected to the image forming apparatus 110.

The controller 112 reads the retrieved image data files and file information thereof from the media reader 111. The file information read out from the external memory device 120 through the media reader 111 will hereinafter be referred to as 'received file information.' Among the received file information, the file information of the image data file which has been printed through the print part 116 of the image forming apparatus 110 at least once, will be referred to as 'log file information.' The controller 112 stores the log file information in the memory 113. Additionally, a user may select file information of at least one image data file through the manipulation part 115 and group the selected image data files together. The file information of such created group will be referred to as 'group file information.'

The user may create group file information of several file groups. The controller 112 stores the group file information in the memory 113. The controller 112 is also able to read the log file information and the group file information from the memory 113 and display this information through the display 114. A data file, which corresponds to the file information selected by the user through the manipulation part 115, is transmitted to the print part 116.

The memory 113 stores the transmitted log file information and the group file information received through the controller 112.

The display 114 displays the file information received from the controller 112 in the form of texts or graphics for the recognition of users. A liquid crystal display (LCD) which can represent texts or graphics can be used as the display 114.

The manipulation part 115 is provided for the interface with the user, and may include a keyboard or a button. The selection made by the user through the manipulation of a keyboard or a button is transmitted to the controller 112. While viewing the contents of the display 114, the user may manipulate the keyboard or a button to view other contents or select at least one file information among the currently displaying file information.

The print part 116 operates to print an image in accordance with the image data file transmitted from the controller 112.

Figure 2:
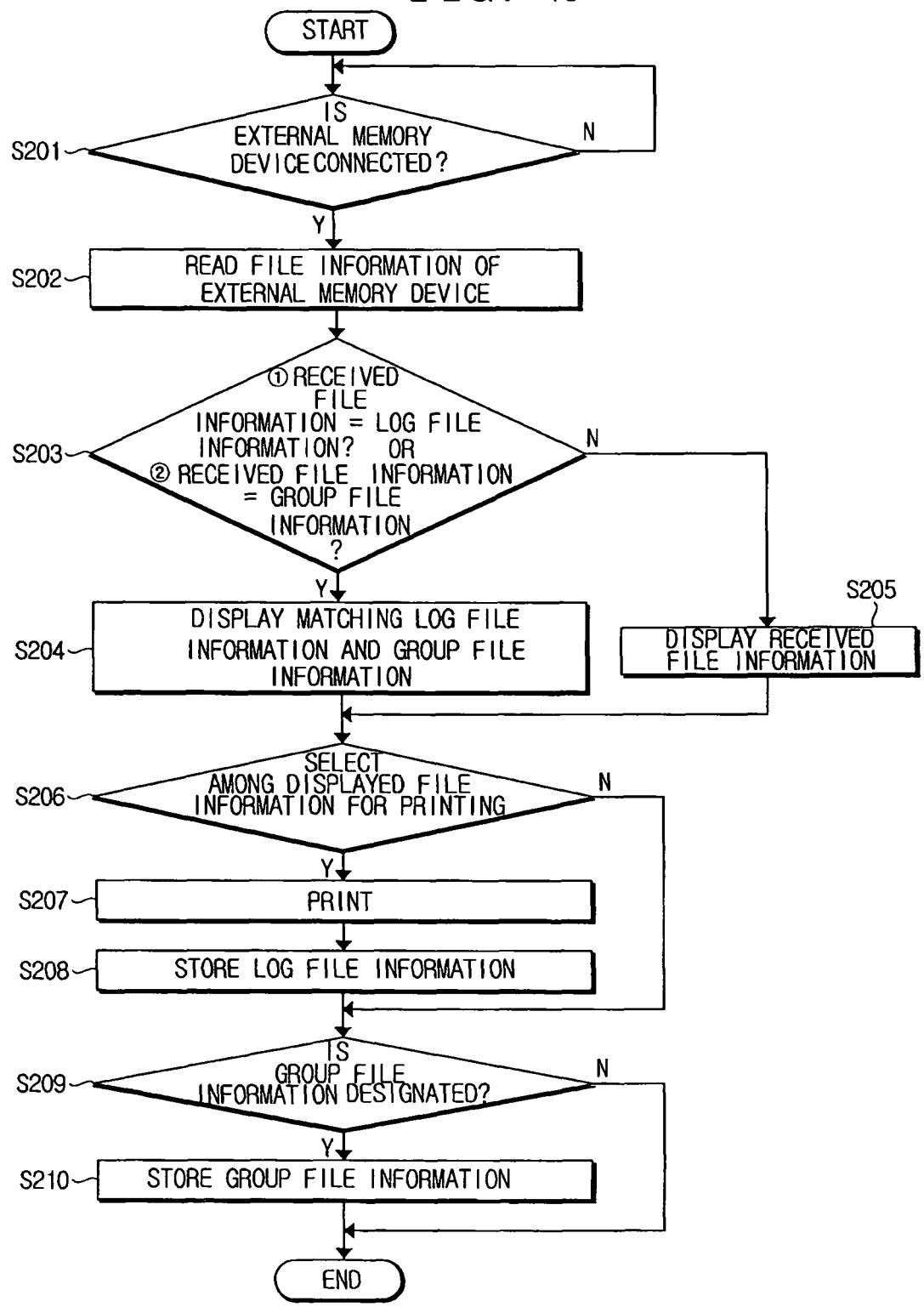
FIG. 2 is a flowchart illustrating a printing log management operation according to an embodiment of the present general inventive concept.

FIG. 2 illustrates printing log management operations according to an embodiment of the present general inventive concept. The operation of the image forming apparatus having a printing log management operations according to an embodiment of the present general inventive concept will now be described with reference to FIGS. 1 to 3.

First, the external memory device 120 storing therein image data files to be printed is connected to the media reader 111 (operation S201). It is to be noted that the media reader 111 can alternatively receive file information from the external memory device 120 via a wireless connection. Accordingly, the controller 112 reads out received file information from the external memory device 120 through the media reader 111 (operation S202).

After the controller 112 reads out received file information from the media reader 111, the controller 112 reads out log file information and group file information from the memory 113. The controller 112 compares the log file information with the received file information and determines whether any information matches. The controller 112 also determines whether the received file information matches with the group file information (operation S203).

Whether the log file information matches with the received file information or whether the group file information matches with the received file information can be determined based on several methods. For example, these determinations can be made by comparing the date and time of recording the file in the external memory device 120, and the name and size of the file as recorded in the external memory device 120.

FIG. 3 is an exemplary illustration of log file information and group file information which are stored in a memory according to an embodiment of the present general inventive concept. As illustrated in FIG. 3, the log file information or the group file information includes the time of recording 310, log file information or group file information 320, and the job type 330. In the 'job type' column, the 'print' indicates that the file information belongs to the log file information, 'Group 1' indicates that the file information is selected as a first group. The log file information or the group file information includes the date and time 321 of recording the file in the external memory device 120, the file name 322 and the file size 323. The matching of the information can be determined by using the information 321 to 323.

When there is no file information among the log file information and the group file information that matches with the received file information, the controller 112 transmits all of the received file information read from the media reader 111 so that the information can be displayed through the display 114 (operation S205). When there is any file information among the log file information and the group file information that matches with the received file information, the controller 112 transmits the matching file information to the display 114 so that the display 114 can display the transmitted file information in the form of text or graphics for the recognition of users (operation S204).

The user is able to select a desired file to print among the file information as displayed through the display 114 through the manipulation part 115. If the user does not want printing, the user may have the operation directly proceed to operation S209 (operation S206).

When the user selects the file information to print, the manipulation part 115 transmits the user's selection to the controller 112, and the controller 112 reads out the data file corresponding to the selected file information from the media reader 111 and transmits the read information to the print part 116. The print part 116 prints an image corresponding to the received data file onto a printing paper (operation S207).

The controller 112 designates the file information of the printed data file as the log file information, and transmits the log file information to the memory 113 for storage (operation S208). The printed data file may be a first print file, which has been selected through the operations of S205 and S206 and printed for the first time, or a repeat print file which has been selected through the operations of S204 and S206 and printed more than once. When the corresponding log file information is already stored in the memory 113, the time 310 (FIG. 3) of recording log file information alone may be updated to a current time, or otherwise, the log file information may be newly recorded (operation S208).

The user may give separate names to certain data files of the external memory device 120 to distinguish the files from each other. To this end, the user may designate certain received file information displayed through the display 114 as the group file information through the manipulation of the manipulation part 115. The user also may select and designate different received files as the group file information by varying a previously designated group (operation S209).

When the group file information is designated by the user as described above, the controller 112 stores the group file information to the memory 113 (operation S210).

Accordingly, by using the log file information and the group file information as stored through the operations of S208 and S210, the user can have a data file corresponding to the file information designated as the log file information or the group file information be printed easily and rapidly when the external memory device or other types of external memory device 120 is re-connected.

According to another feature of the present general inventive concept, by printing out all the stored log file information of the memory 113 through the print part 116, the history of printed image data files of an image forming apparatus can easily be viewed.

As described above in a few exemplary embodiments of the present general inventive concept, the data files of images are recorded if the images are printed at least once, and therefore, the printing logs of the image forming apparatus can be efficiently managed.

Furthermore, when the user wants to print a previously-printed image, and especially when the user wants to print an image which has been specifically selected and designated by the user, the user can have the printout of the desired image without spending much time and labor for the processes such as search and designation of a corresponding data file. This aspect of the present general inventive concept will be more effective as the technology of external memory device improves and capacity thereof increases.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming device which allows a connection of an external memory device storing therein print data and file information corresponding to the print data, the image forming device comprising:
   a separate memory from the external memory device, the separate memory to store log file information associated with previously printed print data;
   a connecting part to connect the external memory device;
   a controller to store group file information in the separate memory that includes file information selected from among the file information received through the connecting part, to compare the log file information and the file information of the connected external memory device and to confirm whether the printing has been previously performed, and to determine whether the received file information matches with the group file information; and
   a display to display a comparison result of the log file information and the file information of the connected external memory device,
   wherein the external memory device is a portable memory device, and when the external memory device or other type of external memory device is re-connected to the image forming device, the controller reads from the memory the log file information and the group file information which correspond to the re-received file information transmitted through the connecting part from the re-connected external memory device or other type of external memory device, and displays the log file information and the read group file information through the display.

2. The image forming device of claim 1, wherein at least one among the print data and the corresponding log file information is displayed by the display.

3. The image forming device of claim 1, further comprising a print part to print at least one of the print data and the corresponding file information.

4. The image forming device of claim 3, wherein the controller controls the print part such that the print part prints out an image which corresponds to the print data corresponding to selected information among the log file information and the group file information displayed through the display.

5. The image forming device of claim 4, further comprising a manipulation part to enable selection of at least one among the log file information and the group file information which are displayed through the display.

6. A printing log management method of an image forming device which allows a connection with an external memory device, the external memory device storing therein print data and file information corresponding to the print data, the printing log management method comprising:
   reading out the print data and the corresponding file information from the external memory device; and
   comparing the read file information and pre-stored log file information associated with previously printed print data that is stored in a separate memory device in the image forming device from the external memory device, determining whether the file information in the separate memory device matches with group file information, confirming whether or not the printing has been previously performed, and displaying a comparison result of the read file information and the pre-stored log file information on a display of the image forming device;
   designating certain selected file information among the read file information as the group file information and storing the group file information,
   wherein the external memory device is a portable memory device, and when the external memory device or another type of external memory device is re-connected, re-reading from the re-connected external memory device the file information, and displaying the file information which corresponds to the stored log file information and the stored group file information.

7. The printing log management method of claim 6, further comprising printing an image onto a printing paper, the image corresponding to a print data which corresponds to selected information among the displayed log file information and the group file information.

8. An image forming device capable of reading image data files stored within an external memory device, the image forming device comprising:
   a control unit to compare file information of an image data file read from the external memory device with previously stored file information to determine whether printing of the print data has been previously performed, and to store group file information comprising file information selected among the file information of read image data files, and when an image data file is read from an external memory device, the control unit to compare group file information previously stored with group file information of an image data file being read;
   a memory that is separate from the external memory device to store file information corresponding to print data of read image data files; and
   a display to display a comparison result of the file information of the external memory device and the previously stored file information, and at least one of the print data and the corresponding file information,
   wherein the external memory device is a portable memory device, and when the external memory device or other type of external memory device is re-connected to the image forming device, the control unit reads the previously stored file information and the group file information which correspond to the re-received file information from the re-connected external memory device or other type of external memory device, and displays the previously-stored file information and the read group file information through the display.

9. The image forming device of claim 8, wherein each time an image data file is read from an external memory device, the control unit compares previously stored file information in the memory with file information of the image data file being read and determines whether a match exists, and if a match exists, the control unit transmits the matching file information to the display to be displayed, otherwise the control unit transmits all of the file information of the image data file being read to the display to be displayed and stores the file information of the read image data in the memory.

10. The image forming device of claim 9, wherein the matching is performed using information including at least one of date and time the file information was recorded in the external memory device, the file name stored in the external memory device, and the file size of the file stored in the external memory device.

11. The image forming device of claim 9, wherein when a match is determined when the control unit compares the group file information previously stored in the memory with the group file information of the image data filed being read, the control unit transmits the matching previously stored group file information to the display to be displayed, otherwise the control unit transmits the group file information of the image data file being read to the display to be displayed.

12. The image forming device of claim 11, further comprising a print part to print at least one of the print data and the corresponding file information.

13. The image forming device of claim 12, wherein the control unit controls the print part such that the print part prints out an image which corresponds to the print data corresponding to selected information among the file information and the group file information displayed through the display.

14. The image forming device of claim 13, further comprising a manipulation part to enable selection of at least one among the file information and the group file information displayed through the display.

15. A print log management method of an image forming device capable of reading image data files stored within an external memory device, the method comprising:
comparing file information of an image file data read from the external memory device with previously stored file information in a separate memory device in the image forming device from the external memory to determine whether printing of the print data has been previously performed;
determining whether the file information in the separate memory device matches with group file information;
displaying a comparison result of the image file data of the external memory device and the previously stored file information, and at least one of the print data and the corresponding file information, and
when the external memory device or other type of external memory device is re-connected to the image forming device, reading the previously stored file information and the group file information which correspond to the re-received file information from the re-connected external memory device or other type of external memory device, and displaying the previously-stored information and the read group file information.

16. The method of claim 15, wherein each time an image data file is read from an external memory device, the comparing operation compares previously stored file information with file information of the image data file being read and determines whether a match exists, and if a match exists, transmits the matching file information to the display to be displayed, otherwise the comparing operation transmits all of the file information of the image data file being read to the display to be displayed and stores the file information of the image data file being read with the previously stored file information.

17. A method of logging print data which an image forming device reads from an external storage device, the method comprising:
reading the print data and corresponding file information from an external storage device;
determining whether the read print data and corresponding file information matches stored file information in a separate memory device in the image forming device from the external storage device corresponding to print data previously printed, determining whether the file information in the separate memory device matches with group file information, and displaying the match results on a display of the image forming device; and
designating certain selected file information among the read file information as the group file information and storing the group file information,
wherein the external memory device is a portable memory device, when the external memory device or other type of external memory device is re-connected to the image forming device, reading the stored file information and the group file information which correspond to the re-received file information from the re-connected external memory device or other type of external memory device, and displaying the stored information and the read group file information through the display.

18. The method of claim 17, further comprising displaying the matching stored file information and corresponding print data previously printed if it is determined that a match exists, otherwise displaying the print data and corresponding file information being read and storing the corresponding file information being read.

19. The method of claim 18, further comprising printing an image onto a printing paper, the image corresponding to a print data which corresponds to selected information among the displayed file information and the group file information.

20. A method of printing print data through an image forming device after reading an image data file containing the print data from an external storage device, the method comprising:
reading an image data file from an external storage device;
comparing file information about the image data file current being read with stored file information in a separate memory device in the image forming device from the external storage device associated with previously read image data files to determine if a match exists, determining whether the file information in the separate memory device matches with group file information, and displaying the match results on a display of the image forming device;
storing the file information about the image data file current being read if a match does not exist and displaying the file information about the image data file currently being read, otherwise displaying the file information associated with a previously read image data file which matches with the file information about the image data file currently being read,
wherein the external storage device is a portable memory device, and when the external memory device or other type of external memory device is re-connected to the image forming device, reading the file information and the group file information which correspond to the re-received file information from the re-connected external memory device or other type of external memory device, and displaying the file information and the read group file information.

21. An image forming device to print data, comprising:
a memory unit to store file information; and
a controller to control a read operation of an image data file from an external storage device, to compare file information about the read image data file with stored file information in the memory unit associated with previously read image data files to determine if a match exists, to determine whether the file information in the memory unit matches with the group file information, to display the match results on a display unit, and to store file information about the read image data file if a match does not exist, otherwise to display the file information on the display unit associated with a previously read image data file which matches with the file information about the read image data file, wherein the external storage device is a portable memory device and is separate from the memory unit, and when the external storage device or other type of external memory device is re-connected to the image forming device, the controller reads the file information and the group file information which correspond to the re-received file information from the re-connected external memory device or other type of external memory device, and displays the file information and the read group file information.

* * * * *